Patented Oct. 31, 1944

2,361,498

UNITED STATES PATENT OFFICE 2,361,498

METHOD OF PRODUCING STARCHES

William R. Richee, New York, N. Y., assignor to Stein, Hall and Company, Inc., New York, N. Y., a corporation of New York No Drawing. Application August 23, 1941, Serial No. 408,091

9 Claims. (Cl. 195—7)

This invention relates to new and improved starch products and a method for the manufacture thereof.

One of the objects of the invention is to provide a new and improved method for improving the color of starch products.

Another object of the invention is to provide a new and improved method for reducing the amount of soluble material present in starch products due to the fermentation of the sugars present.

Still a further object of the invention is to produce new and improved starch products characterized by an improved color, a reduction of the amount of soluble material ordinarily present in such products, the absence of certain undesirable organisms heretofore present in such products and a lowering in the amount of ash.

A more specific object of the invention is to provide a new and improved method of processing root starches, especially sweet potatoes, in order to obtain new and improved starch products. Other objects will appear hereinafter.

These objects are accomplished in accordance with this invention by treating the starch with certain micro-organisms capable of reacting with the soluble materials such as sugars ordinarily present in starches. Excellent results have been obtained in accordance with the invention by employing yeast as the micro-organisms for the treatment of the starch. The specific conditions of treatment may vary somewhat as hereinafter described.

One method of practicing the invention is to place the whole, sliced, broken or otherwise ground starchy vegetable material, for example, sweet potatoes, cassava, or Yucca roots and white (or Irish) potatoes, in water and treat the resultant starch suspension, either in the presence of the pulp or after the pulp is separated, with a quantity of yeast sufficient to ferment the sugars present to alcohols. The quantity of yeast will depend upon the amount of sugars and other water soluble materials present in the solution. An alkali is preferably added to retard the development of acid producing organisms, as, for example, those bacteria which produce lactic and butyric acids. In carrying out the invention it is also desirable to have calcium ions present in order to supply a medium for the proper growth of the yeast. The calcium ions also have the effect of precipitating colloidal substances negatively charged. Some of these are ordinarily present and are precipitated. In the purification of starch during the manufacturing process, as hereinafter described, a sludge is produced.

It is preferable in accordance with the invention to supply both the alkaline medium and the calcium ions by means of lime water, that is to say, calcium hydroxide dispersed in water.

The pH of the reaction mixture is rather important. As a general rule, if the pH is much below 5.5 there is apt to be too much of a loss of starch due to the fermenting action of the microorganism where yeast is employed. The maximum pH is preferably about 9.5 but is not so important as the minimum pH and can be somewhat higher. However, a higher alkalinity reduces the efficiency of the manufacture of the starch. The pH value normally decreases during the treatment of the starch. This decrease is principally due to the action of the soil or acid producing bacteria which are normally present as an impurity, for example, lactic, butyric acid producers. A small decrease is probably due partly to the carbon dioxide which is generated by the fermenting process and also from the air reaction upon the lime water to precipitate calcium carbonate, but the greater decrease is no doubt from bacterial action as the decrease is much slower when yeast is used than when it is not.

The invention has two principal aspects, namely, (1) in the preparation of stable dehydrated starchy materials, and (2) in the purification and manufacture of starches by wet processes.

In the dehydration process a suitable fermenting micro-organism such as yeast is added to a water solution containing the whole, sliced, broken or otherwise ground vegetable material, for example, sweet potatoes or white potatoes. To accelerate the process it is preferable to use sliced vegetable material. The sliced material, preferably consisting of slices about ½ in. to ¾ in. in cross section, is placed in a suitable receptacle and subsequently covered with a saturated solution of lime water. A small amount of yeast is added and mixed into the solution with the sliced potatoes and the solution is allowed to stand until the pH value becomes substantially acid. At that time the water is drained off, the slices are rinsed with clear water and allowed to dry in a current of warm air. This method has the advantage of eliminating the solubles such as sugars from the slices of vegetable material, for example, potatoes, by first diffusing the sugars and subsequently fermenting them into alcohol. It may be desirable to express part of the water by pressure before drying.

Samples of sweet potatoes dried in this manner have retained their stability over a long period of time.

In the manufacture of starch by the so-called wet processes the yeast may be added when the potatoes, or other farinaceous materials, are ground prior to the process of screening, settling and tabling. The yeast is allowed to go through the process of screening, settling and tabling and is finally starved out by the loss of sugars by fermentation and dilution in the regular starch process of screening, settling, decantation and subsequently tabling, bleaching and de-watering before drying.

The time required to effect the reaction may vary. In the dehydration process, using slices of the raw material about ½ in. thick at room temperature, or 77° F., the sugar should be fermented in 48 to 60 hours. If the temperature is increased, the action will be accelerated. The action of yeast is increased approximately 4 times with each 10° rise in temperature.

In a starch manufacturing or purifying process the settling operation usually requires from about 8 to 24 hours and the total time required is usually from 24 hours to 72 hours, depending upon the starch process.

The reaction is generally carried out in open vessels preferably at temperatures within the range from about 32° F. to about 100° F.

The invention will be further illustrated but is not limited by the following examples in which the quantities are stated in parts by weight unless otherwise indicated:

Example I

Sixty thousand (60,000) lbs. of sweet potatoes will yield 15,000 lbs. of starch, and 1800 lbs. of sugar, and other soluble materials contained in the sweet potato when processed in the usual manner. In accordance with the present invention, to 60 000 lbs. of sweet potatoes there is added 1 lb. of yeast and approximately 30,000 gallons of a clear saturated water solution of calcium hydroxide. The temperature can be varied, but for ease of control, 75° F. to 80° F. has been found to be best in practice. The water solution of calcium hydroxide is added in the first operation of screening. The pH is preferably controlled between a pH of 8.6 and 9.2. The starch is processed in the usual manner by settling for 8 to 24 hours, decanting and subsequently tabling, bleaching and de-watering. In addition to the 30.000 gallons of calcium hydroxide solution used in the first operation of screening, approximately 30 000 more gallons of water are used in the subsequent washings and dilutions.

Example II

Sliced sweet potatoes and sliced white potatoes, each consisting of slices about ½ in. to ¾ in. thick, were placed in separate receptacles and subsequently covered with a saturated solution of lime water. A small amount of yeast was added in sufficient quantity to convert the sugars present to alcohols. The solution had a pH value of 9.6 and was allowed to stand at 77° F. until the pH value had dropped to 5.5. The water was then drained off, the slices were rinsed with clean water and were allowed to dry in a current of warm air. In each case a product of excellent stability was obtained.

The invention is applicable to all farinaceous material purification where soil or acid producing bacteria are present as an impurity. If grain or our from grain is used instead of roots or tubers, it is normally necessary to vary the amount of water present to compensate for less water in the raw material. In practical operation it is best to steep the grain sufficiently to soften it before grinding it. Among the root starches which may be treated in accordance with the invention are sweet potatoes, cassava, sago or Irish potatoes. As examples of grain starches which may be treated in accordance with the invention may be mentioned corn, wheat, rye, rice, oats and barley.

The principal micro-organism which has been employed in accordance with the invention is yeast. As is well known, yeast ferments sugars to carbon dioxide and alcohol by virtue of the enzymes (zymases) it contains. Yeast also contains invertase, an enzyme which converts cane sugar to invert sugar. Other enzymes capable of converting sugars, or other soluble portions of the farinaceous materials to substances which are not sugars, for example, alcohols, may be employed in accordance with the invention.

The practice of this invention not only prevents certain undesirable side reactions but also the ash content of the starch may be considerably reduced. While the invention is not limited to any theory, it is believed that the yeast cells utilize the calcium and magnesium in the ash of the starch in their life cycle. When these cells are washed away there is a resulting reduction in the amount of ash left in the starch.

Having thus described the invention, what I claim as new and desire to secure by Letters Patent of the United States is:

1. A method for producing improved stable farinaceous products from farinaceous materials originally containing sugars and soil bacteria which comprises treating said farinaceous materials with yeast in an alkaline medium, continuing said treatment at a decreasing pH until said medium is acidic and until substantially all of said sugars have been removed from the resultant mixture and then separating the residual farinaceous products from the resultant mixture.

2. A method for producing improved stable starchy products from farinaceous materials containing sugars and soil bacteria which comprises treating said farinaceous materials with yeast initially in an alkaline medium in the presence of a yeast food but under pH conditions insufficiently high to cause any substantial reaction upon the starchy portion of said farinaceous materials, and continuing said treatment at a decreasing pH until said medium is acidic and until substantially all of the sugars therein have disappeared.

3. A method for producing improved starchy products from farinaceous materials containing soil bacteria and minor amounts of sugars which comprises treating said farinaceous materials in water with a substantial quantity of yeast, in the presence of calcium ions at a pH on the alkaline side less than about 9.5, and continuing said treatment at a decreasing pH on the acid side not lower than about 5.5 until substantially all of the sugars have disappeared.

4. A method for producing starchy products from farinaceous materials normally containing sugars and soil bacteria which comprises treating the farinaceous materials with a substantial quantity of yeast, effecting said treatment initially in the presence of water and calcium hydroxide at a pH on the alkaline side insufficiently high to cause a substantial reaction upon the starchy constituents of the farinaceous material, continuing said treatment at a decreasing pH until the sugars present have been removed from the reaction mixture and separating the starchy constituents from the reaction mixture.

5. A method of producing purified root starches from raw or impure root starches which comprises treating said raw or impure starches with yeast in the presence of water initially under alkaline conditions, continuing the treatment at a decreasing pH under acidic conditions and under such conditions as to remove substantially all of the sugars without reacting substantially upon the starchy components present, and separating said starchy components.

6. A method for producing stable dehydrated root starches from root starches normally containing sugars which comprises reacting upon said root starches normally containing sugars with yeast in an initially alkaline medium, continuing the reaction at a decreasing pH until said medium is substantially acidic and until said sugars have been substantially removed therefrom, then separating the starchy components from the reaction mixture and drying said starchy components.

7. A method for producing starches from sweet potatoes which comprises treating the raw or partially purified sweet potatoes still containing a substatnial amount of sugars with yeast in an aqueous calcium hydroxide medium at a pH within the range from about 8.6 to 9.2 at a temperature from about 32° F. to about 100° F., continuing said treatment at a decreasing pH until the sugars present have been substantially removed from the mixture, then separating and recovering the starch.

8. In a method of producing starches from starchy raw materials, the step which comprises cultivating yeast in the presence of said raw materials in an alkaline medium sufficiently alkaline to retard the growth of acid producing bacteria.

9. A method of producing starches from starchy raw materials which comprises cultivating yeast in the presence of said raw materials in sufficient amount to lower the ash content of the resultant starch, in a medium decreasing in pH from initial alkalinity to final acidity.

WILLIAM R. RICHEE.

CERTIFICATE OF CORRECTION.

Patent No. 2,361,498.

October 31, 1944.

WILLIAM R. RICHEE.

It is hereby certified that error appears in the printed specification of the above numbered patent requiring correction as follows: Page 2, second column, line 1, for "our" read --flour--; page 3, second column, line 4, claim 7, for "substatnial" read --substantial--; and that the said Letters Patent should be read with this correction therein that the same may conform to the record of the case in the Patent Office.

Signed and sealed this 30th day of January, A. D. 1945.

Leslie Frazer (Seal)

Acting Commissioner of Patents.

starchy constituents of the farinaceous material, continuing said treatment at a decreasing pH until the sugars present have been removed from the reaction mixture and separating the starchy constituents from the reaction mixture.

5. A method of producing purified root starches from raw or impure root starches which comprises treating said raw or impure starches with yeast in the presence of water initially under alkaline conditions, continuing the treatment at a decreasing pH under acidic conditions and under such conditions as to remove substantially all of the sugars without reacting substantially upon the starchy components present, and separating said starchy components.

6. A method for producing stable dehydrated root starches from root starches normally containing sugars which comprises reacting upon said root starches normally containing sugars with yeast in an initially alkaline medium, continuing the reaction at a decreasing pH until said medium is substantially acidic and until said sugars have been substantially removed therefrom, then separating the starchy components from the reaction mixture and drying said starchy components.

7. A method for producing starches from sweet potatoes which comprises treating the raw or partially purified sweet potatoes still containing a substatnial amount of sugars with yeast in an aqueous calcium hydroxide medium at a pH within the range from about 8.6 to 9.2 at a temperature from about 32° F. to about 100° F., continuing said treatment at a decreasing pH until the sugars present have been substantially removed from the mixture, then separating and recovering the starch.

8. In a method of producing starches from starchy raw materials, the step which comprises cultivating yeast in the presence of said raw materials in an alkaline medium sufficiently alkaline to retard the growth of acid producing bacteria.

9. A method of producing starches from starchy raw materials which comprises cultivating yeast in the presence of said raw materials in sufficient amount to lower the ash content of the resultant starch, in a medium decreasing in pH from initial alkalinity to final acidity.

WILLIAM R. RICHEE.

CERTIFICATE OF CORRECTION.

Patent No. 2,361,498.   October 31, 1944.

WILLIAM R. RICHEE.

It is hereby certified that error appears in the printed specification of the above numbered patent requiring correction as follows: Page 2, second column, line 1, for "our" read --flour--; page 3, second column, line 4, claim 7, for "substatnial" read --substantial--; and that the said Letters Patent should be read with this correction therein that the same may conform to the record of the case in the Patent Office.

Signed and sealed this 30th day of January, A. D. 1945.

Leslie Frazer (Seal)   Acting Commissioner of Patents.